United States Patent
Choong et al.

(10) Patent No.: US 12,061,583 B1
(45) Date of Patent: Aug. 13, 2024

(54) SYSTEMS FOR PROCESSING DATA USING STAGES

(71) Applicant: Amazon Technologies, Inc., Seattle, WA (US)

(72) Inventors: Jason Choong, Belmont, CA (US); Matthew Patrick Herscovitch, Oakland, CA (US); Manish Geverchand Jain, Bothell, WA (US); Edwin Ricardo Mendez Rodriguez, Seattle, WA (US); Raghavendra Ramakrishnaiah Guru, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/037,187

(22) Filed: Sep. 29, 2020

(51) Int. Cl.
| | |
|---|---|
| *G06F 7/00* | (2006.01) |
| *G06F 16/21* | (2019.01) |
| *G06F 16/23* | (2019.01) |
| *G06F 16/2457* | (2019.01) |

(52) U.S. Cl.
CPC ........ *G06F 16/219* (2019.01); *G06F 16/2358* (2019.01); *G06F 16/2365* (2019.01); *G06F 16/24573* (2019.01)

(58) Field of Classification Search
CPC ............ G06F 16/219; G06F 16/24573; G06F 16/2358; G06F 16/2365
USPC ................ 707/695, 602, 687, 692, 703, 736
See application file for complete search history.

(56) References Cited

U.S. PATENT DOCUMENTS

| | | | |
|---|---|---|---|
| 9,229,952 B1* | 1/2016 | Meacham | G06F 16/1873 |
| 11,003,645 B1* | 5/2021 | Thompson | G06F 16/26 |
| 11,048,590 B1* | 6/2021 | Sapuntzakis | G06F 16/2365 |
| 2003/0048415 A1* | 3/2003 | Echigo | G06T 7/20 |
| | | | 352/38 |
| 2011/0288970 A1* | 11/2011 | Kidron | G06Q 40/12 |
| | | | 709/219 |
| 2012/0258795 A1* | 10/2012 | Ryan | G07F 17/3206 |
| | | | 463/29 |
| 2013/0024642 A1* | 1/2013 | Flynn | H05K 7/1487 |
| | | | 711/170 |
| 2014/0011595 A1* | 1/2014 | Muller | A63F 13/35 |
| | | | 463/42 |
| 2014/0108310 A1* | 4/2014 | Baughman | G06N 20/10 |
| | | | 706/12 |
| 2015/0195315 A1* | 7/2015 | Kidron | H04L 65/612 |
| | | | 709/219 |

(Continued)

*Primary Examiner* — Md I Uddin
(74) *Attorney, Agent, or Firm* — Lee & Hayes, P.C.

(57) ABSTRACT

Systems and techniques for processing data using data pipelines. For instance, a first version of data may be read from one or more databases for processing by a data pipeline. Stages of the data pipeline may then process the data, such as by transforming, validating, or changing the data, in order to generate additional versions of the data. These versions of the data are passed through the subsequent stages of the data pipeline. Additionally, metadata may be generated for one or more stages of the data pipeline, where the metadata represents information describing the processing by the one or more stages. This metadata may also be passed through the subsequent stages of the data pipeline. Based on the last stage of the data pipeline processing the data, the versions of the data along with the metadata may then be written into the one or more databases.

20 Claims, 8 Drawing Sheets

(56) References Cited

U.S. PATENT DOCUMENTS

| | | | |
|---|---|---|---|
| 2017/0039253 A1* | 2/2017 | Bond | G06F 16/9024 |
| 2017/0244770 A1* | 8/2017 | Eckerdal | G06F 16/639 |
| 2017/0300552 A1* | 10/2017 | Mandadi | G06F 16/9024 |
| 2019/0347244 A1* | 11/2019 | Jacob | G06F 16/2455 |
| 2020/0125549 A1* | 4/2020 | Hoang | G06F 16/2358 |
| 2020/0210389 A1* | 7/2020 | Swami | G06F 16/215 |
| 2020/0210401 A1* | 7/2020 | Swami | G06F 16/215 |
| 2021/0182248 A1* | 6/2021 | Jayanthi | G06F 16/27 |
| 2021/0224246 A1* | 7/2021 | Soini | G06F 16/95 |
| 2021/0248144 A1* | 8/2021 | Haile | G06N 5/04 |

\* cited by examiner

SYSTEMS FOR PROCESSING DATA USING STAGES

BACKGROUND

A data pipeline can include a set of stages for processing inputted data. To process the data using a stage of the data pipeline, the stage reads a version of the data from a database, processes the version of the data to generate a new version of the data, and then writes the new version of the data back into the database. Each of the subsequent stages of the data pipeline can then perform similar techniques of reading a current version of the data from the database, processing the current version of the data to generate a new version of the data, and writing the new version of the data back into the database until all of the stages of the data pipeline have processed the data. However, since data pipelines are used for efficiency and scalability when processing data, reading data from and/or writing data to databases between each stage can cause processing latency throughout the data pipelines. Additionally, in some circumstances, it may be important to track changes introduced to the data by the processing that is performed at each stage of the data pipelines.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The system(s)s depicted in the accompanying figures are not to scale and components within the figures may be depicted not to scale with each other.

DETAILED DESCRIPTION

Figure 1:
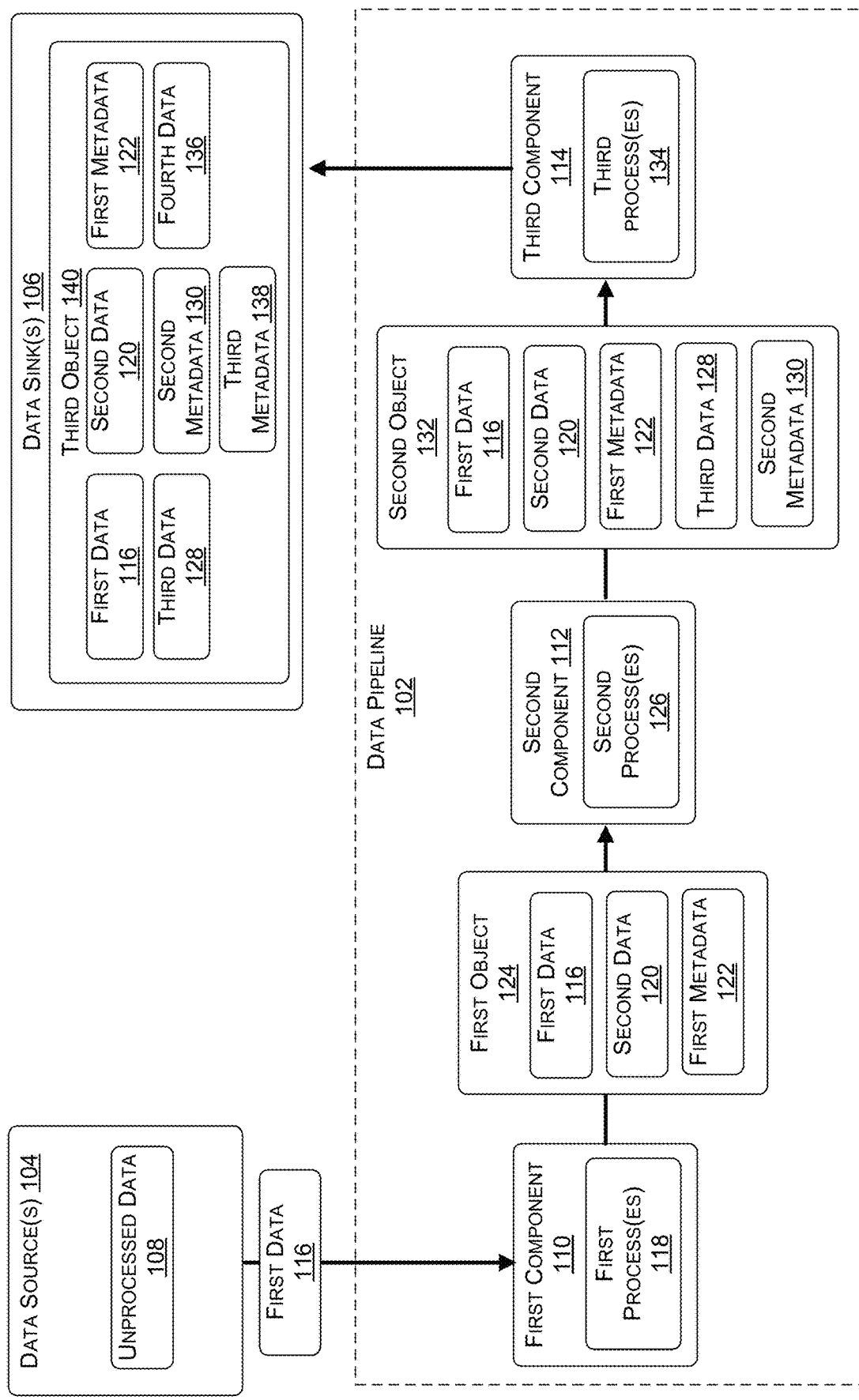
FIG. 1 illustrates a first example environment for processing data using a data pipeline, according to an embodiment of the present disclosure.

As discussed above, a data pipeline can include a set of stages for processing inputted data. To process the data using a stage of the data pipeline, the stage reads a version of the data from a database, processes the version of the data in order to generate a new version of the data, and then writes the new version of the data back into the database. Each of the subsequent stages of the data pipeline can then perform similar techniques of reading a current version of the data from the database, processing the current version of the data in order to generate a new version of the data, and writing the new version of the data back into the database until all of the stages of the data pipeline have processed the data. However, since data pipelines are used for efficiency and scalability when processing data, reading data from and/or writing data to databases between each stage can cause processing latency throughout the data pipelines. Additionally, in some circumstances, it may be important to track changes introduced to the data by the processing that is performed at each stage of the data pipeline.

As such, discussed herein, among other things, are new techniques for processing data using data pipelines. For instance, system(s) may use a data pipeline in order to process data using multiple stages. To process the data, an initial stage of the data pipeline may retrieve an initial version of the data, process the initial version of the data in order to generate a new version of the data and metadata describing the processing, generate a data packet that includes at least (1) a copy of the initial version of the data, (2) the new version of the data, and (3) the metadata, and then provide the data packet to a second component of the data pipeline. Each stage of the data pipeline may then perform similar techniques of retrieving a version of the data (e.g., a latest version of the data) from a data packet, processing the version of the data in order to generate a new version of the data, generating metadata describing the processing, generating a data packet that includes each version of the data as well as the metadata from each stage, and providing the data packet to the next stage. These techniques may occur until the last stage of the data pipeline, which may output the data from a last data packet to one or more data sinks. Using such techniques to process data using a data pipeline may reduce the latency of the data pipeline and/or allow users to track changes that occur at each stage of the data pipeline.

For more detail, the system(s) may receive data (e.g., raw data) from multiple user devices and store the data in one or more data sources(s). A data source may include, but is not limited to, a database, a data store, a file, a file system, email, and/or any other type of repository that is capable of storing data. In some instances, the system(s) receive, from a user device, data as part of messages. For example, the messages may include at least identifiers of the devices that sent the messages and the data. The system(s) may then process the data (and/or the messages) using a data pipeline. To process the data, the data pipeline includes multiple components (e.g., stages) that may transform the data, validate the data, apply an algorithm that changes the data, and/or process the data using one or more additional processes. In some examples, the data pipeline may include a linear pipeline, where the components sequentially process the data. In some instances, the data pipeline may include a non-linear pipeline, where two or more components may process the same output from a previous component in parallel. Still, in some instances, the system(s) may use one or more components that are decoupled from the data pipeline in order to process the data.

The system(s) may also track changes that occur to the data throughout the processing of the data using the data pipeline. For example, when a component processes the data, the system(s) (e.g., the component) may generate metadata representing information that describes the processing of the data using the component. The information may include, but is not limited to, a current version of the data, a status associated with the data, a type of the data, a change that occurred during the processing, a reason for the processing, an error that occurred, code that caused the error, a version of the data pipeline, a version of the component that performed the processing, an identifier of a previous component within the data pipeline, an identifier of a next component within the data pipeline, a timestamp indicating when the component processed the data, a timestamp indicating when the data pipeline processed the data, and/or any other information that describes the processing of the data. In some instances, the system(s) generate metadata for each component that processes the data. In other instances, the system(s) generate metadata for certain component(s) that process the data.

When processing the data, and in order to reduce the latency within the data pipeline, the system(s) may only read the initial data (e.g., the raw data) from the one or more data sources at the beginning of the processing using the data pipeline and then output the final data to one or more data sinks at the end of processing. A data sink may include, but is not limited to, a data store, a database, another data pipeline, a computer, a phone, a system, and/or any other medium that is capable of receiving the final data. For an example of reducing the latency, the system(s) may only read the initial data from the one or more data sources at the beginning of the processing using the data pipeline and then write the final data into one or more databases (e.g., a data sink) at the end of processing.

As such, in order to maintain tracking throughout the data pipeline, the system(s) (e.g., the component(s)) may generate data object(s) that include each version of the data throughout the data pipeline as well as the metadata representing the information that describes the processing of the data using the components. A data object may include, but is not limited to, a data packet, a data blob, a data chunk, and/or any other mechanisms that may be used to collect and send data. In some instances, a component that generates a data object may send the data object directly to the next component within the data pipeline. In other instances, a component that generates a data object may write the data object to a temporary storage (e.g., a data buffer), where the next component within the data pipeline is then able to read the data object from the temporary storage. In either of the examples, the next component is then able to retrieve the data from the data object (e.g., the current version of the data) for processing.

For an example of processing data using the data pipeline, the system(s) may store a first version of data in one or more data sources. A first component of the data pipeline may then read the first version of the data from the one or more data sources for processing. In this example, the first component may process the first version of the data by transforming the data from a first type of data (e.g., a "raw" type) to a second type of data (e.g., a "normalized" type). The first component may also generate first metadata representing information that describes the processing. For instance, the first metadata may represent information indicating that the data was transformed from the first type of data to the second type of data. The first component may then provide a copy of the first version of the data, the second version of the data, and/or the first metadata to a second component of the data pipeline. In some instances, to provide the data, the first component generates a first data object that includes (1) the copy of the first version of the data, (2) the second version of the data, and (3) the first metadata and sends the first data object to the second component. In other instances, the first component initially stores the first data object in a temporary memory, which is then retrieved by the second component.

The second component may then process the second version of the data (which may be retrieved from the first data object) in order to generate a third version of the data. In this example, the second component may process the second version of the data by converting one or more values represented by the data from a first standard (e.g., Imperial Units) to a second standard (e.g., International System of Units). The second component may also generate second metadata representing information that describes the processing. For instance, the second metadata may represent information indicating that the reason for the processing is to convert the units to the second standard. The second component may then send the copy of the first version of the data, a copy of the second version of the data, the first metadata, the third version of the data, and/or the second metadata to a third component of the data pipeline. In some instances, to provide the data, the second component generates a second data object that includes (1) the first version of the data, (2) the copy of the second version of the data, (3) the first metadata, (4) the third version of the data, and/or (5) the second metadata and sends the second data object to the third component. In other instances, the second component initially stores the second data object in a temporary memory, which is then retrieved by the third component.

The third component may then process the third version of the data (which may be retrieved from the second data object) in order to generate a fourth version of the data. In this example, the third component may process the third version of the data by validating the data and setting a status (e.g., verified, errors, etc.) for the data. The third component may also generate third metadata representing information that describes the processing. For instance, the third metadata may represent information indicating the reason for the determined status (e.g., the third component found an error in the data). The third component may then send the copy of the first version of the data, the copy of the second version of the data, the first metadata, a copy of the third version of the data, the second metadata, the fourth version of the data, and the third metadata to a fourth component of the data pipeline. In some instances, to provide the data, the third component generates a third data object that includes (1) the first version of the data, (2) the copy of the second version of the data, (3) the first metadata, (4) the copy of the third version of the data, (5) the second metadata, (6) the fourth version of the data, and (6) the third metadata and sends the third data object to the fourth component. In other instances, the third component initially stores the third data object in a temporary memory, which is then retrieved by the fourth component.

These processes may continue to be performed by each of the remaining components of the data pipeline until a last component of the data pipeline processes the data. The last component of the data pipeline may then output, to a data sink, each of the versions of the data as well as the metadata. In some instances, to output the data, the last component of the data pipeline generates a data object that includes each of the versions of the data and the metadata and outputs the data object to the data sink. Additionally, or alternatively, in some instances, to output the data, the last component separately outputs each of the versions of the data and the metadata to the data sink. In either of the instances, and in this example, the data being processed by the data pipeline may only be received from of the one or more data sources (e.g., read out of one or more data stores) before being input into the data pipeline and the processed data and/or the metadata may only be output to the data sink after the processing is complete. This may reduce the latency associated with processing the data and still allow for tracking of the changes throughout the stages of the data pipeline.

Additionally, examples where the components write the data to the temporary memories between processing may also reduce the latency. For example, and as discussed above, previous techniques for processing data using data pipelines writes the data to and reads the data from databases between components. This may require each component to search through the databases in order to retrieve the data for processing, which creates latency within the data pipeline. In contrast, the memories of the data pipeline described herein may only store the data that is necessary for the next component to process. As such, the component is not required to search through a large database for the data, which reduces the latency within the data pipeline. Additionally, the data may be removed from the memories after processing. This reduces the amount of data that is stored in the memories while the data pipeline is performing the processing.

In some instances, the system(s) may update one or more components of the data pipeline. For instance, the system(s) may update an algorithm of a component when an error occurs within the data pipeline. Based on updating a component, the system(s) may then process the data using the updated data pipeline. In some instances, the system(s) process the data by once again inputting the data into the beginning of the data pipeline and processing the data using each of the components. Additionally, or alternatively, in some instances, the system(s) process the data by starting the processing at the updated component. For example, if the system(s) update the third component of the data pipeline, then the system(s) may begin processing the data using the third component. Since the system(s) began processing the data using the third component, the system(s) may provide the third component which each version of the data and/or the metadata that is associated with the components that are before the third component in the data pipeline. This way, the system(s) do not have to once again process the data using the entire data pipeline, which may reduce the time it takes to process the data.

In some instances, a single component of the data pipeline may process data using multiple processes. For example, a component may process a first version of data using a first algorithm in order to generate a second version of the data and then process the second version of the data using a second algorithm in order to generate a third version of the data. In such instances, the data passed to the next component and/or output to the one or more data sinks may include each version of the data (e.g., a copy of the second version of the data and the third version of the data) as well as metadata representing information for each process (e.g., metadata representing information for processing the data using the first algorithm and metadata representing information for processing the data using the second algorithm). Alternatively, the data passed to the next component and/or output to the one or more data sinks may include the latest version of the data (e.g., the third version of the data) as well as metadata representing information for the last process performed by the component (e.g., the metadata representing information for processing the data using the second algorithm).

In some instances, a component of the data pipeline may not change the data during processing. For example, the component may verify the data, but not change the actual data during verification. In examples where the component does not change the data, the component may either generate a copy of the data to send to the next component and/or store in the databases, or the component may just send the same data to the next component and/or databases. Using either technique, the component may still generate and send the metadata representing the information describing the processing that was performed by the component on the data. For example, and using the verification example, the component may send the same data that was processed by the component along with metadata indicating whether the data was verified by the component.

In some instances, and as discussed above, the system(s) may process the data using a non-linear data pipeline. For example, a first component of the data pipeline may process a first version of the data in order to generate a second version of the data and first metadata. Next, a second component of the data pipeline may process the second version of the data in order to generate a third version of the data and second metadata and a third component of the data pipeline may process the second version of the data in order to generate a fourth version of the data and third metadata. In other words, the same output from the first component may be processed by both the second component and the third component. In some instances, when processing data using a non-linear data pipeline, all of the data from all of the components may be output to a data sink, such as in a data object. In other instances, when processing data using a non-linear data pipeline, the data output by the non-linear components may be output to different data sinks.

In some instances, such as when the data being processed is included in messages, the system(s) may process the messages using one or more techniques. For a first example, the system(s) may individually process messages using the data pipeline. For instance, the system(s) may process a first message using the data pipeline, followed by processing a second message using the data pipeline, followed by processing a third message using the data pipeline, and so forth. For a second examples, the system(s) may batch process multiple messages using the data pipeline. For instance, the system may retrieve a batch of messages (e.g., 2 messages, 5 messages, 100 messages, 1,000 messages, 100,000 messages, and/or any other number of messages) for processing. The system may then input a first message from the batch into the data pipeline and, before the processing is finished, input a second message from the batch into the data pipeline. In other words, the system(s) may concurrently process more than one message from the batch of messages. In such an example, different components of the data pipeline may be processing different messages concurrently with one another. This may reduce the overall latency of the data pipeline.

In some instances, the system(s) may then allow one or more users to query for data generated by the data pipeline. For instance, the system(s) may receive, from an electronic device, a request for a version of the data and/or metadata representing information describing the process(es) performed to generate the version of the data. The system(s) may then search through one or more databases (e.g., the data sink) to retrieve the version of the data and/or the metadata and send the version of the data and/or the metadata back to the electronic device. In some instances, when versions of the data and/or the metadata are stored in a data object, the system(s) may retrieve the version of the data and/or the metadata from the data object for sending to the electronic device. In some instances, when the versions of the data and/or the metadata are stored separately, the system(s) may retrieve the version of the data and/or the metadata directly from the one or more databases for sending to the electronic device.

In some instances, by performing the processes described herein, the system(s) are able to reduce latency when processing data using a data pipeline. For example, rather than having each component of the data pipeline read data from and/or write data to one or more databases while processing the data, the system(s) (e.g., the first component) may only read the data from the one or more data sources when inputting the data into the data pipeline and the system(s) (e.g., the last component) may only output the final data to a data sink (e.g., write the data to one or more databases) after processing (where the final data includes each of the previous versions of the data as well as the metadata that is used to track changes throughout the processing). By removing the need to read the data from and write the data into the one or more databases by each component, the system(s) reduce the latency it takes to process the data. Additionally, by storing the entire history of the processing, the system(s) may allow queries for various versions of the data as well as verifications and audits for each of the processing steps.

Additionally, while the examples above describe processing the data using data pipelines, in other examples, similar processes may be performed when processing data without using data pipelines. For example, similar processes may be performed when processing data using more than two components, where each component separately processes the data, but not necessarily in a data pipeline.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the system(s)(s), and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

Figure 3:
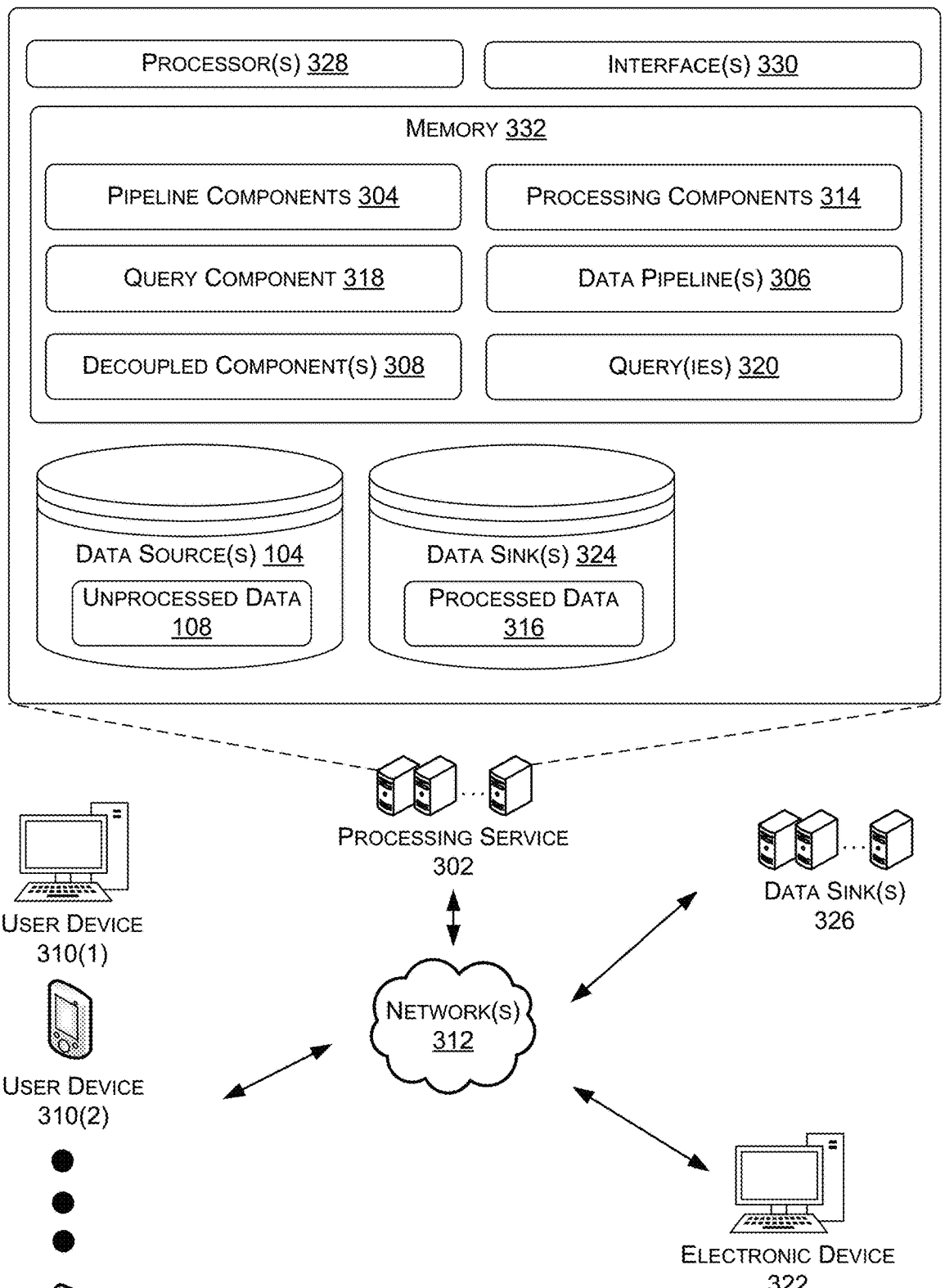
FIG. 3 illustrates an example system for processing data using data pipeline(s), according to an embodiment of the present disclosure.

FIG. 1 illustrates a first example environment for processing data using a data pipeline 102, according to an embodiment of the present disclosure. As shown, the first example environment includes the data pipeline 102, data source(s) 104, and data sink(s) 106. The data source(s) 104 may store unprocessed data 108 (e.g., raw data) that is waiting to be processed using the data pipeline 102. In some instances, the unprocessed data 108 may represent messages that a processing service (which is illustrated in FIG. 3) receives from user devices. Additionally, the data pipeline 102 may output data that has been processed to the data sink(s) 106. Furthermore, in the example of FIG. 1, the data pipeline 102 includes three components 110-114 that linearly process the unprocessed data 108. However, in other examples, the data pipeline 102 may include any other type of data pipeline (e.g., a non-linear data pipeline). Additionally, in other examples, one or more of the components 110-114 may decoupled from the data pipeline 102. Furthermore, in other examples, the data pipeline 102 may include less components or more components than the three components 110-114 illustrated in the example of FIG. 1.

A data pipeline, such as the data pipeline 102, may include a set of processing stages (which are represented by the components 110-114) that process data (e.g., the unprocessed data 108) in a series. For instance, and in the example of FIG. 1, the data pipeline will process the unprocessed data 108 in the series of stages that includes a first stage represented by the first component 110, followed by a second stage represented by the second component 112, and finally followed by a third stage represented by the third component 114. However, any number of stages and components within the data pipeline 102 are contemplated herein. Data pipelines provide advantages when processing data, such as increasing the speed at which the data is processed, increasing the scalability when processing data (e.g., processing large amounts of data concurrently), providing easy management when processing the data (e.g., tracking changes that occur to the data while processing), and others. Each component 110-114 of the data pipeline 102 may include a respective stage that uses process(es) for transforming, validating, or changing the data.

For a first example, process(es) may transform the data unprocessed data 108 from a first type of data to a second, different type of data. For instance, if the data includes video data, the process(es) may transform the data from a first type of video data (e.g., H.264) to a second type of video data (e.g., MPEG-4). For a second example, the process(es) may validate the data by determining whether there are any errors within the data. For instance, if the data represents a set of values, the process(es) may validate whether the set of values are correct. For a third example, the process(es) may change information represented by the data. For instance, if the data represents a first type of values, such as SI values, then the process(es) may change the values to a second type of values, such as Imperial values. While these are just a couple of examples of process(es) that may be performed by the components 110-114, in other examples, the components 110-114 may perform any other type of process(es) on the data.

As shown, the processing service may input first data 116, from the unprocessed data 108, into the data pipeline 102. In some instances, the unprocessed data 108 may include raw data that is received directly from one or more sources (e.g., the user devices from FIG. 3). For example, the unprocessed data 108 may include readings data received from meters, video data captured by cameras of an electronic device (e.g., a mobile telephone, a tablet device, etc.), transaction data received from point-of-sale (POS) devices, messages received from user devices, audio data received from voice-controlled devices, location data received from user devices, and/or any other type of data. As described herein, the data that has yet to be processed using the data pipeline 102 may be referred to as the unprocessed data 108 (and/or raw data). Additionally, data that has been processed using one or more of the components 110-114 of the data pipeline 102 may be referred to as processed data.

First, the first component 110 of the data pipeline 102 may process the first data 116 (which may represent a first version of the unprocessed data 108) using one or more first process(es) 118. The first process(es) 118 may include one or more algorithms and/or rules that are configured to transform, validate, change, and/or perform any other type of process to the first data 116 in order to generate second data 120 (which may represent a second version of the data).

Additionally, the first component 110 (and/or another component of the processing service) may be configured to generate first metadata 122 representing information that describes the first process(es) 118 that the first component 110 performs on the first data 116. As described herein, the information may include, but is not limited to, a current version of the second data 120 (e.g., the second version), a status associated with the second data 120, a type of the second data 120, a change that occurred during the processing, a reason for the processing, whether an error that occurred, code that caused the error, a version of the data pipeline 102, a version of the first component 110 that performed the processing, an identifier of a next component (e.g., the second component 112) within the data pipeline 102, a timestamp indicating when the first component 102 processed the first data 116, a timestamp indicating when the data pipeline 102 processed the data, and/or any other information that describes the processing of the first data 116.

In some instances, the processing service (e.g., the components 110-114 of the data pipeline 102) may generate metadata in order to track the process(es) that occur to the data during processing by the data pipeline 102. For example, the metadata may represent information indicating why the data was transformed, changed, and/or validated during processing using the data pipeline 102. For another example, the metadata may represent information indicating how the data was transformed, changed, and/or validated during processing using the data pipeline 102. By generating the metadata, users of the data pipeline 102 are then able to review the information represented by the metadata in order to determine why and/or how the data was processed by each of the components 110-114 of the data pipeline 102. In other words, the users are able to track the changes that occur to the data as the data is processed through the data pipeline 102.

The first component 110 (and/or the processing service) may then provide a copy of the first data 116, the second data 120, and the first metadata 122 to the second component 112. In the example of FIG. 1, to provide the data, the first component 110 (and/or the processing service) generates a first data object 124 that includes at least the copy of the first data 116, the second data 120, and the first metadata 122. The first component 110 (and/or the processing service) then sends the first data object 124 from the first component 110 to the second component 112. As such, the first component 110 does not have to write the data to one or more databases and/or the second component 112 does not have to read the data from the one or more databases. This may reduce the total latency for the processing performed by the data pipeline 102.

Second, the second component 112 of the data pipeline 102 may retrieve the second data 120 from the first data object 124 and process the second data 120 using one or more second process(es) 126. The second process(es) 224 may include one or more algorithms and/or rules that are configured to transform, validate, change, and/or perform any other type of process to the second data 120 in order to generate third data 128 (which may represent a third version of the data). Additionally, the second component 112 (and/or another component of the processing service) may be configured to generate second metadata 130 representing information that describes the second process(es) 126 that the second component 112 performs on the second data 120. The information may include, but is not limited to, a current version of the third data 128 (e.g., the third version), a status associated with the third data 128, a type of the third data 128, a change that occurred during the processing, a reason for the processing, whether an error that occurred, code that caused the error, the version of the data pipeline 102, a version of the second component 112 that performed the processing, an identifier of the previous component (e.g., the first component 110) within the data pipeline 102, an identifier of a next component (e.g., the third component 114) within the data pipeline 102, a timestamp indicating when the second component 112 processed the second data 120, the timestamp indicating when the data pipeline 102 processed the data, and/or any other information that describes the processing of the second data 120.

The second component 112 (and/or the processing service) may then provide the copy of the first data 116, a copy of the second data 120, the first metadata 122, the third data 128, and the second metadata 130 to the third component 114. In the example of FIG. 1, to provide the data, the second component 112 (and/or the processing service) generates a second data object 132 that includes at least the copy of the first data 116, the copy of the second data 120, the first metadata 122, the third data 128, and the second metadata 130. The second component 112 (and/or the processing service) then sends the second data object 132 from the second component 112 to the third component 114. As such, the second component 112 does not have to write the data to the data sink(s) 106 and/or the third component 114 does not have to read the data from the data sink(s) 106. This may reduce the total latency for the processing performed by the data pipeline 102.

Third, the third component 114 of the data pipeline 102 may retrieve the third data 128 from the second data object 132 and process the third data 128 using one or more third process(es) 134. The third process(es) 134 may include one or more algorithms and/or rules that are configured to transform, validate, change, and/or perform any other type of process to the third data 128 in order to generate fourth data 136 (which may represent a fourth version of the data). Additionally, the third component 114 (and/or another component of the processing service) may be configured to generate third metadata 138 representing information that describes the third process(es) 134 that the third component 114 performs on the third data 128. The information may include, but is not limited to, a current version of the fourth data 136 (e.g., the fourth version), a status associated with the fourth data 136, a type of the fourth data 136, a change that occurred during the processing, a reason for the processing, whether an error that occurred, code that caused the error, a version of the data pipeline 102, a version of the third component 114 that performed the processing, an identifier of a previous component (e.g., the second component 112) within the data pipeline 102, a timestamp indicating when the third component 114 processed the third data 128, the timestamp indicating when the data pipeline 102 processed the data, and/or any other information that describes the processing of the third data 128.

The third component 114 (and/or the processing service) may then output the copy of the first data 116, the copy of the second data 120, the first metadata 122, a copy of the third data 128, the second metadata 130, the fourth data 136, and the third metadata 138 to the data sink(s) 106. In the example of FIG. 1, to output the data, the third component 114 (and/or the processing service) generates a third data object 140 that includes at least the copy of the first data 116, the copy of the second data 120, the first metadata 122, the copy of the third data 128, the second metadata 130, the fourth data 136, and the third metadata 138. The third component 114 (and/or the processing service) then outputs the third data object 140 to the data sink(s) 106. However, in other examples, the third component 114 (and/or the processing service) may separately output one or more of the copy of the first data 116, the copy of the second data 120, the first metadata 122, the copy of the third data 128, the second metadata 130, the fourth data 136, and the third metadata 138 to the data sink(s) 106. In some instances, such as when the data sink(s) 106 include one or more databases, outputting the data may include the third component 114 (and/or the processing service) writing the data to the one or more databases.

As shown in the example of FIG. 1, the results of processing the data using the data pipeline 102 include copies of each previous version of the data during processing as well as the final version of the data after the processing is complete. This way, different users are able to query different versions of the data. For example, a first user may be interested in the second version of the data that is output by the first component 110 (e.g., the second data 120). As such, the first user is able to query the processing service for the copy of the second version of the data that is output to the data sink(s) 106. Additionally, a second user may be interest in the third version of the data that is output by the second component 112 (e.g., the third data 128). As such, the second user is able to query the processing service for the copy of the third version of the data that is output to the data sink(s) 106. In other words, users are able to query the processing service for more than just the first version of the data (e.g., the first data) and the final version of the data (e.g., the fourth data 136).

For an example of processing data using the data pipeline 102, the processing service may store a first version of a message in the data source(s) 104, which may be represented by the unprocessed data 108. The first component 110 of the data pipeline 102 may then read the first version of the message from the data source(s) 104 for processing. In this example, the first component 110 may process the first version of the message by transforming the message from a first type of message (e.g., a "raw" type) to a second type of message (e.g., a "normalized" type). The first component 110 may also generate first metadata 122 representing information that describes the processing. For instance, the first metadata 122 may represent information indicating that the message was transformed from the first type of message to the second type of message. The first component 110 may then provide a copy of the first version of the message, the second version of the message (which may be represented by the second data 120), and/or the first metadata 122 to the second component 112. In some instances, to provide the data, the first component 110 generates the first data object 124 and then sends the first data object 124 to the second component 112.

The second component 112 may then process the second version of the message (which may be retrieved from the first data object 124) in order to generate a third version of the message (which may be represented by the third data 128). In this example, the second component 112 may process the second version of the message by converting one or more values represented by the message from a first standard (e.g., Imperial Units) to a second standard (e.g., International System of Units). The second component 112 may also generate second metadata 130 representing information that describes the processing. For instance, the second metadata 130 may represent information indicating that the reason for the processing is to convert the units to the second standard. The second component 112 may then send the copy of the first version of the message, a copy of the second version of the message, the first metadata 122, the third version of the message, and/or the second metadata 130 to the third component 114. In some instances, to provide the data, the second component 112 generates the second data object 132 and then sends the second data object 132 to the third component 114.

The third component 114 may then process the third version of the message (which may be retrieved from the second data object 132) in order to generate a fourth version of the message (which may be represented by the fourth data 136). In this example, the third component 114 may process the third version of the message by validating the values included in the message and setting a status (e.g., verified, errors, etc.) for the message. The third component 114 may also generate third metadata 138 representing information that describes the processing. For instance, the third metadata 138 may represent information indicating the reason for the determined status (e.g., the third component 114 found an error in the message). The third component 114 may then store each version of the message and the metadata in the data sink(s) 106. In the example of FIG. 1, to store the data, the third component 114 generates the third data object 140 and then writes the third data object 140 into the data sink(s) 106.

It should be noted that while the example of FIG. 1 illustrates using data objects 124 and 132 to send the data between the components 110-114, in other examples, the components 110-114 (and/or the processing service) may separately send the data from the data objects 124 and 132 between the components 110-114. Additionally, while the example of FIG. 1 illustrates the data source(s) 104 as being separate from the data sink(s) 106, in other examples, the data source(s) 104 and the data sink(s) 106 may include a single database. Furthermore, while the example of FIG. 1 describes sending the copy of first data 116 through the data pipeline 102, in other examples, a reference (e.g., version number, name, number, an identifier, etc.) associated with the first data 116 may alternatively be passed through the data pipeline 102. This is because the first data 116 is already stored in the data source(s) 104 and as such, the data pipeline 102 may not pass the copy of the first data 116 through the data pipeline 102.

Figure 2:
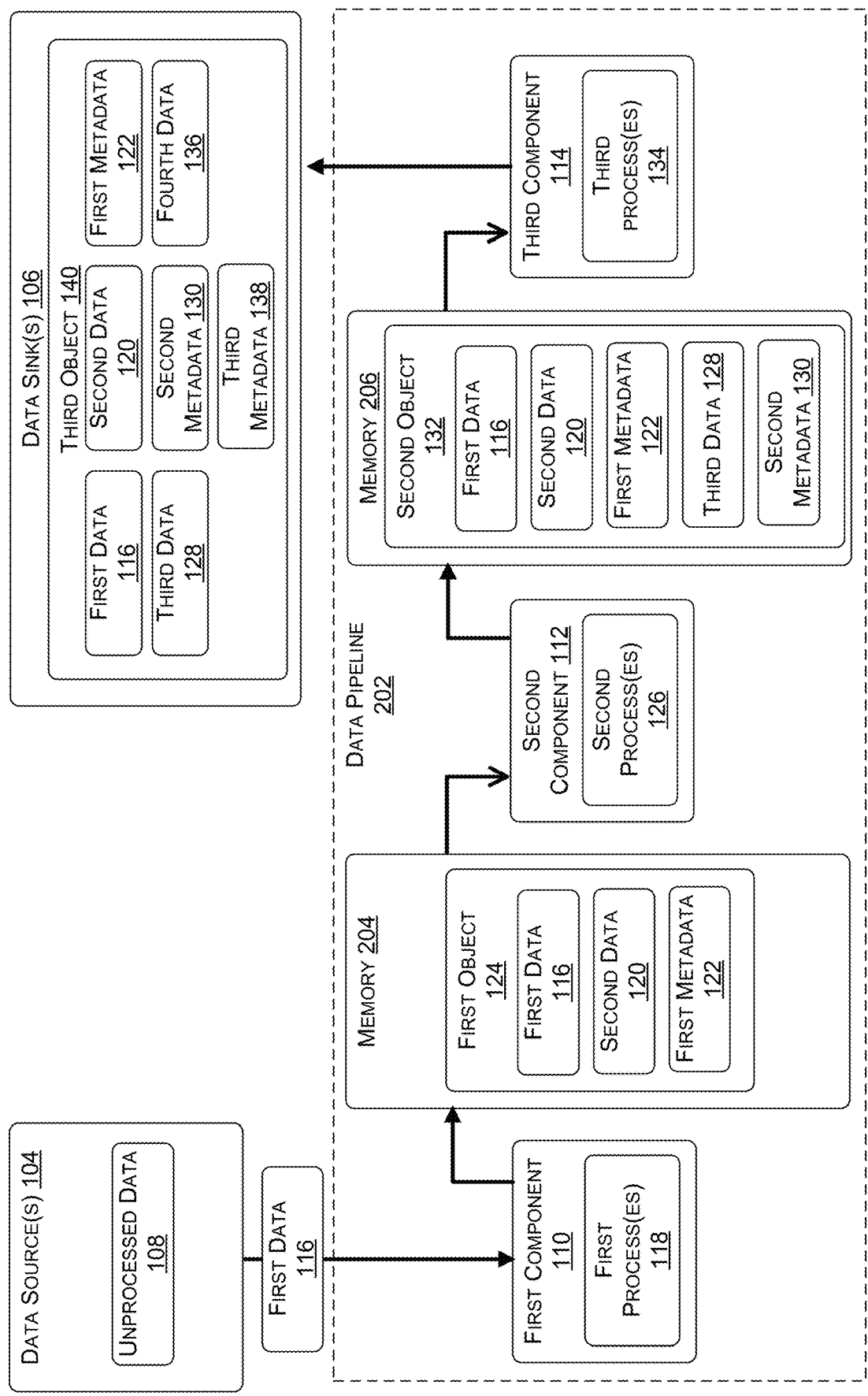
FIG. 2 illustrates a second example environment for processing data using a data pipeline, according to an embodiment of the present disclosure.

FIG. 2 illustrates a second example environment for processing data using a data pipeline 202, according to an embodiment of the present disclosure. In the example of FIG. 2, the data pipeline 202 may be similar to the data pipeline 102. For example, the data pipeline 202 may include the same component 110-114 for processing the unprocessed data 108 stored in the data source(s) 104. However, in the example of FIG. 2, the data pipeline 202 may include memory 204-206 for temporarily storing data. Although the data pipeline 202 of FIG. 2 includes two memories 204-206, in other examples, the data pipeline 202 may not include one of the memories 204-206.

In the example of FIG. 2, the first component 110 may again process, using the first process(es) 118, the first data 116 in order to generate the second data 120 and the first metadata 122. The first component 110 (and/or the processing service) may also generate the first data object 124 that includes the copy of the first data 116, the second data 120, and the first metadata 122. However, in the example of FIG. 2, instead of providing the first data object 124 directly to the second component 112, the first component 110 (and/or the processing service) may store the first data object 124 in the first memory 204 (e.g., write the first data object 124 into the first memory 204). Additionally, the second component 112 (and/or the processing service) may retrieve the first data object 124 from the first memory 204 (e.g., read the first data object 124 from the first memory 204).

Additionally, in the example of FIG. 2, the second component 112 may again process, using the second process(es) 126, the second data 120 from the first data object 124 in order to generate the third data 128 and the second metadata 130. The second component 112 (and/or the processing service) may also generate the second data object 132 that includes the copy of the first data 116, the copy of the second data 120, the first metadata 122, the third data 128, and the second metadata 130. However, in the example of FIG. 2, instead of providing the second data object 132 directly to the third component 114, the second component 112 (and/or the processing service) may store the second data object 132 in the second memory 206 (e.g., write the second data object 132 into the second memory 206). Additionally, the third component 114 (and/or the processing service) may retrieve the second data object 132 from the second memory 206 (e.g., read the second data object 132 from the first memory 204).

Because the memories 204-206 are for temporary storage, the processing service (and/or the components 110-114) may then remove the first data object 124 from the first memory 204 and/or remove the second data object 132 from the second memory 206. In some instances, the processing service may remove the first data object 124 from the first memory 204 based on the second component retrieving the first data object 124 and/or processing the second data 120. In some instances, the processing service may remove the second data object 132 from the second memory 206 based on the third component 114 retrieving the second data object 132 and/or processing the third data 128. Still, in some instances, the processing service may remove the first data object 124 from the first memory 204 and/or remove the second data object 132 from the second memory 206 based on the third component 114 outputting the data to the data sink(s) 106. While these are just a couple of examples of when the processing service may remove the first data object 124 from the first memory 204 and/or remove the second data object 132 from the second memory 206, in other examples, the processing service may remove the data objects 124 and 132 at different times.

It should be noted that, in some instances, the components 110-114 (and/or the processing service) may not generate the first data object 124 and/or the second data object 132. Rather, the first component 110 may store the data from the first data object 124 directly int the first memory 204 and/or the second component 112 may store the data from the second data object 132 directly in the second memory 206.

FIG. 3 illustrates an example processing service 302 for processing data using data pipeline(s), according to an embodiment of the present disclosure. As shown, the processing service 302 may include a pipeline component 304 that is configured to generate and update data pipeline(s) 306 (which may represent, and/or include, the data pipeline 102 and/or the data pipeline 202). In some instances, the pipeline component 304 may generate a data pipeline 306 by generating the components associated with the data pipeline 306, which may include coupled component(s) (e.g., components 110-114) and/or decoupled component(s) 308. In some instances, the pipeline component 304 generates the components using inputs received from at least one user device 310(1)-(N) (also referred to as the "user devices 310). For example, the processing service 302 may allow users to both generate and maintain data pipelines 306. After generating the data pipelines 306, the processing service 302 may also allow the users to process the unprocessed data 108 using the data pipelines 306.

For example, the processing service 302 may receive the unprocessed data 108 and then store the unprocessed data 108 in the data source(s) 104. In some instances, the processing service 302 receives the unprocessed data 108 from the user devices 310. The user devices 310 may include, but are not limited to, computers, laptops, mobile phones, tables, meters, Internet of Things (IoT) devices, and/or any other type of device that may send the unprocessed data 108 to the system(s) via network(s) 312. As described above, in some instances, the unprocessed data 108 may be included in messages that are received by the processing service 302.

After receiving and storing the unprocessed data 108, a processing component 314 of the processing service 302 may process the unprocessed data 108 using a data pipeline 306 (and/or decoupled component(s) 308). For example, the processing component 314 may input the unprocessed data 108 into the data pipeline 306. The data pipeline 306 may then process the unprocessed data 108 using the techniques described with respect to FIG. 1, the techniques described with respect to FIG. 2, and/or one or more other techniques. After processing the unprocessed data 108, the processing component 314 (and/or the last component of the data pipeline 306) may output processed data 316 to data sink(s). In some instances, the processed data 316 may include data objects that include one or more versions of associated with processing the data and/or metadata representing information describing the processing of the data, similar to the third data object 140. In some instances, the processed data 316 may separately include the one or more versions associated with processing the data and/or the metadata.

As further illustrated in the example of FIG. 3, the processing service 302 may include a query component 318 that is configured to receive queries 320 for data from an electronic device 322. The queries 320 may be associated with the processed data 316. For example, a query 320 may by for a specific version of the processed data 316 and/or metadata representing information describing a process that was performed on the processed data 316. Based on receiving the query 320, the query component 318 may be configured to retrieve the requested processed data 316 and/or the metadata from the data sink(s) 106. In some examples, retrieving the data may include retrieving the data from a data object that includes the processed data 316 and/or the metadata. The query component 318 may then be configured to cause the processing service 302 to send, over the network(s) 312, the processed data 316 and/or the metadata to the electronic device 322.

For example, the processing service 302 may receive, from the electronic device 322, a query 320 that identifies a specific version of data (e.g., the second data 120 from the example of FIG. 1). Based on receiving the query 320, the processing service 302 may search through the processed data 316 in order to identify and retrieve the version of the data as well as the metadata that is associated with the version of the data. In some instances, the version of the data and/or the metadata are stored in a data object. For example, the second data 120 and the metadata 122 may be stored within the third data object 140 within the data sink(s) 106. As such, the processing service 302 may retrieve the second data 12 and the metadata 122 from the third data object 140. In some instances, the version of the data and/or the metadata are separately stored from other versions of the data within the data sink(s) 106. For example, the second data 120 and the metadata 122 may be stored within the data sink(s) 106, but separate from the other versions of the data (e.g., not in the third data object 140). As such, the processing service 302 may retrieve the second data 120 and the metadata 122 directly from the database(s) 140. The processing service 302 may then send the version of the data and the metadata to the electronic device 322.

The example of FIG. 3 further includes data sink(s) 324 associated with the processing service 302 and data sink(s) 326. In some instances, the data sink(s) 324 and/or the data sink(s) 326 may represent, and/or include, the data sink(s) 106.

As further illustrated in the example of FIG. 3, the processing service 302 may include processor(s) 328, network interface(s) 330, and memory 332. As used herein, a processor, such as the processor(s) 328, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory 332, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s), such as the network interface(s) 330, may enable data to be sent between devices via network(s) 312. For example, the network interface(s) may enable data to be sent between the processing service 302, the user devices 310, the electronic device 322, and/or with one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol.

Furthermore, each of the network interface(s) may include a wide area network (WAN) component to enable message over a wide area network.

Figure 4:
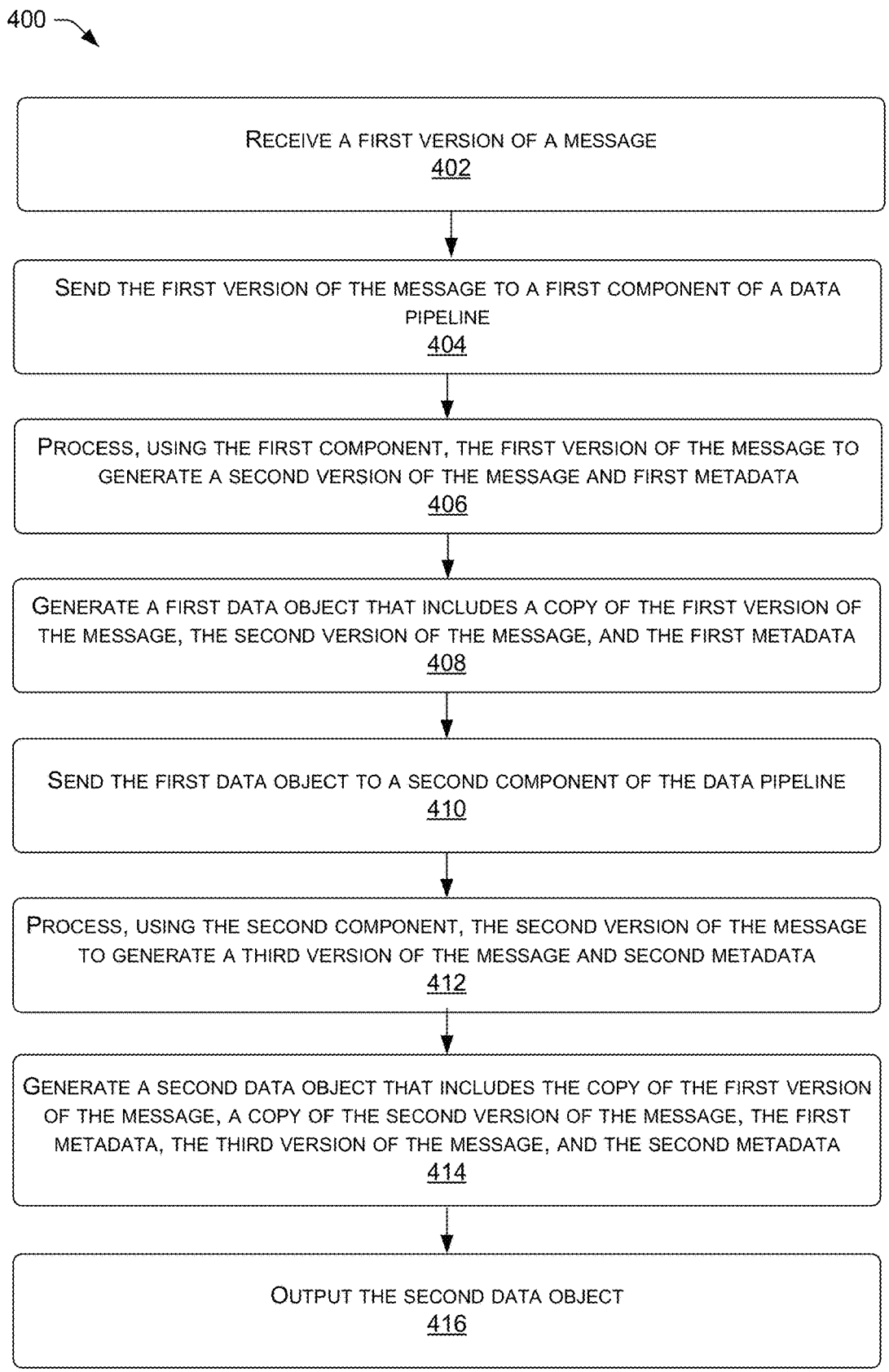
FIG. 4 illustrates an example process for processing a message using a data pipeline, according to an embodiment of the present disclosure.
Figure 5:
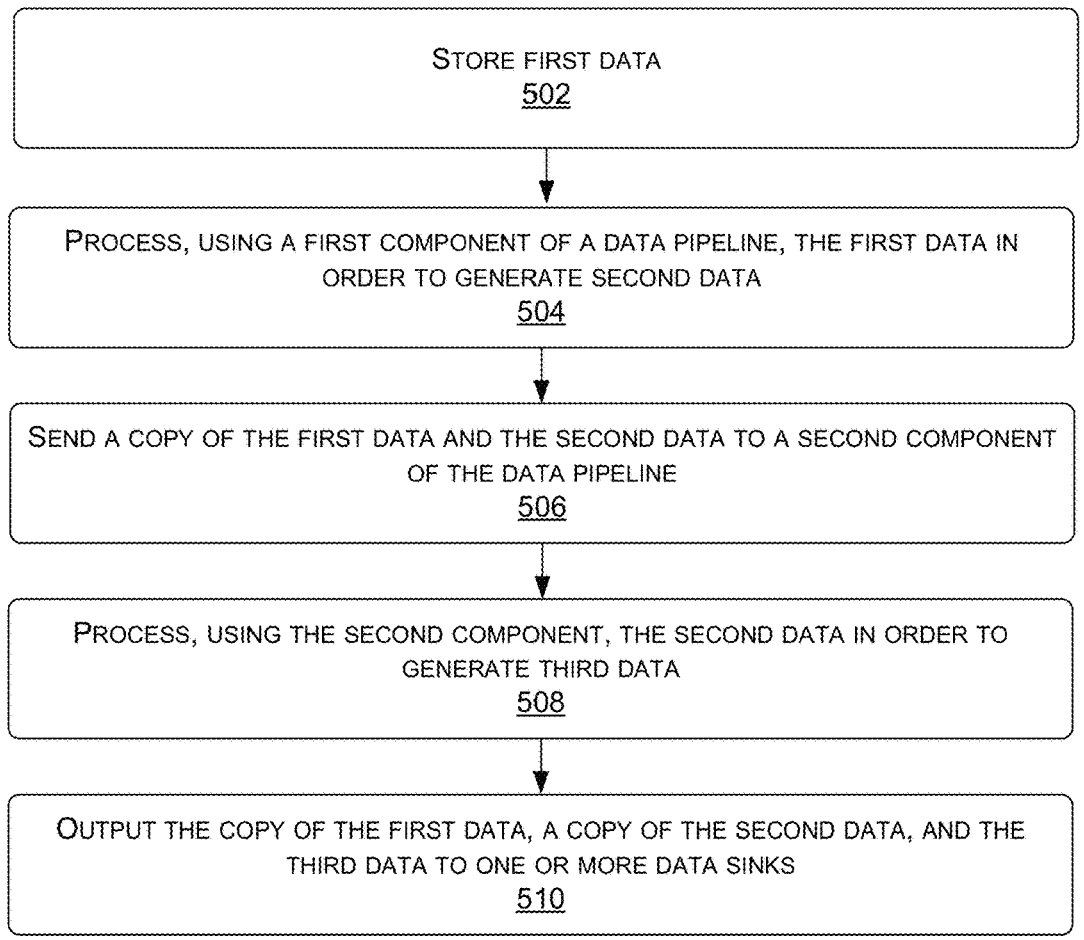
FIG. 5 illustrates an example process for processing data using a data pipeline, according to an embodiment of the present disclosure.

FIGS. 4 and 5 illustrate various processes related to processing data using data pipelines. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIG. 3, although the processes may be implemented in a wide variety of other environments, architectures, and systems.

FIG. 4 illustrates an example process 400 for processing a message using a data pipeline, according to an embodiment of the present disclosure. At 402, the process 400 may include receiving a first version of a message. For instance, the processing service 302 may receive messages from data source(s), such as user devices. The processing service 302 may then store the messages in one or more data sources before processing the messages using one or more data pipelines. In some instances, the first version of the message may include a "raw" message and/or may include "raw" data that has yet to be processed.

At 404, the process 400 may include sending the first version of the message to a first component of a data pipeline. For instance, the processing service 302 may use the data pipeline to process the messages stored in the one or more data sources. As such, the processing service 302 may input the first version of the message into the data pipeline for processing. In some instances, the data pipeline includes a linear data pipeline. In some instances, the data pipeline includes a non-linear data pipeline. Still, in some instances, the data pipeline may use one or more components that are decoupled from the data pipeline to process the messages.

At 406, the process 400 may include processing, using the first component, the first version of the message to generate a second version of the message and first metadata. For instance, the processing service 302 may use the first component of the data pipeline to process the first version of the message. As described herein, the first component may process the first version of the message by transforming, validating, changing, and/or performing one or more other processes on the first version of the message in order to generate the second version of the message. The processing service 302 (e.g., the first component) may also generate first metadata representing information that describes the processing of the first version of the message. As described herein, the information may include, but is not limited to, a current version of the data, a status associated with the data, a type of the data, a change that occurred during the processing, a reason for the processing, an error that occurred, code that caused the error, a version of the data pipeline, a version of the component that performed the processing, an identifier of a previous component within the data pipeline, an identifier of a next component within the data pipeline, a timestamp indicating when the component processed the data, a timestamp indicating when the data pipeline processed the data, and/or any other information that describes the processing of the data.

At 408, the process 400 may include generating a first data object that includes a copy of the first version of the message, the second version of the message, and the first metadata and at 410, the process 400 may include sending the first data object to a second component of a data pipeline. For instance, the processing service 302 (e.g., the first component) may generate the first data object that includes the copy of the first version of the message (and/or a reference associated with the first version of the message), the second version of the message, and the first metadata. The processing service 302 (e.g., the first component) may then send the second component with the first data object. In some instances, sending the first data object may include sending the first data object from the first component to the second component. In some instances, sending the first data object may include the first component writing the first data object in a memory for temporary storage, where the second component then reads the first data object out of the memory.

At 412, the process 400 may include processing, using the second component, the second version of the message to generate a third version of the message and second metadata. For instance, the processing service 302 may use the second component of the data pipeline to process the second version of the message. As described herein, the second component may process the second version of the message by transforming, validating, changing, and/or performing one or more other processes on the second version of the message to generate the third version of the message. The processing service 302 (e.g., the second component) may also generate second metadata representing information that describes the processing of the second version of the message. As described herein, the information may include, but is not limited to, a current version of the data, a status associated with the data, a type of the data, a change that occurred during the processing, a reason for the processing, an error that occurred, code that caused the error, a version of the data pipeline, a version of the component that performed the processing, an identifier of a previous component within the data pipeline, an identifier of a next component within the data pipeline, a timestamp indicating when the component processed the data, a timestamp indicating when the data pipeline processed the data, and/or any other information that describes the processing of the data.

At 414, the process 400 may include generating a second data object that includes the copy of the second version of the message, a copy of the second version of the message, the first metadata, the third version of the message, and the second metadata and at 416, the process 400 may include storing the second data object. For instance, the processing service 302 (e.g., the second component) may generate the second data object that includes the copy of the first version of the message (and/or the reference associated with the first version of the message), the copy of the second version of the message, the first metadata, the third version of the message, and the second metadata. The processing service 302 (e.g., the second component) may then output the second data object to data sink(s). In some instances, outputting the second data object may to the data sink(s) may include writing the second data object into one or more databases.

FIG. 5 illustrates an example process for processing data using a data pipeline, according to an embodiment of the present disclosure. At 502, the process 500 may include storing first data. For instance, the processing service 302 may store the first data in one or more data sources. In some instances, the first data may represent raw data that the processing service 302 receive from user device(s). In some instances, the processing service 302 receive the first data as part of message(s) received from the user device(s). The one or more data sources may be configured to store the first data while the first data is waiting to be processed by a data pipeline.

At 504, the process 500 may include processing, using a first component of a data pipeline, the first data in order to generate second data. For instance, the processing service 302 may use the first component of the data pipeline in order to process the first data. As described herein, the first component may process the first data by transforming, validating, changing, and/or performing one or more other processes on the first data in order to generate the second data. In some instances, the processing service 302 (e.g., the first component) may also generate first metadata representing information that describes the processing of the first data. As described herein, the information may include, but is not limited to, a current version of the data, a status associated with the data, a type of the data, a change that occurred during the processing, a reason for the processing, an error that occurred, code that caused the error, a version of the data pipeline, a version of the component that performed the processing, an identifier of a previous component within the data pipeline, an identifier of a next component within the data pipeline, a timestamp indicating when the component processed the data, a timestamp indicating when the data pipeline processed the data, and/or any other information that describes the processing of the data.

At 506, the process 500 may include sending a copy of the first data and the second data to a second component of the data pipeline. For instance, the processing service 302 (e.g., the first component) may send the second component with the copy of the first data (and/or a reference associated with the first data) and the second data. In some instances, the processing service 302 (e.g., the first component) may also send the second component with the first metadata. In some instances, the processing service 302 (e.g., the first component) sends the data by generating a first data object that includes the copy of the first data and the second data and then sending the first data object to the second component. In some instances, the processing service 302 (e.g., the first component) sends the data by storing the copy of the first data and the second data in memory of temporary storage, where the second component then reads the copy of the first data and the second data from the memory.

At 508, the process 500 may include processing, using the second component, the second data in order to generate third data. For instance, the processing service 302 may use the second component of the data pipeline in order to process the second data. As described herein, the second component may process the second data by transforming, validating, changing, and/or performing one or more other processes on the second data in order to generate the third data. In some instances, the processing service 302 (e.g., the first component) may also generate second metadata representing information that describes the processing of the second data. As described herein, the information may include, but is not limited to, a current version of the data, a status associated with the data, a type of the data, a change that occurred during the processing, a reason for the processing, an error that occurred, code that caused the error, a version of the data pipeline, a version of the component that performed the processing, an identifier of a previous component within the data pipeline, an identifier of a next component within the data pipeline, a timestamp indicating when the component processed the data, a timestamp indicating when the data pipeline processed the data, and/or any other information that describes the processing of the data.

At 510, the process 500 may include outputting the copy of the first data, a copy of the second data, and the third data to the one or more data sinks. For instance, the processing service 302 (e.g., the second component) may output the copy of the first data (and/or the reference associated with the first data), the copy of the second data, and the third data to the one or more data sinks. In some instances, the processing service 302 (e.g., the second component) performs the outputting by generating a second data object that includes the copy of the first data, the copy of the second data, and the third data and outputting the second data object to the one or more data sinks. In some instances, the processing service 302 (e.g., the second component) separately outputs the copy of the first data, the copy of the second data, and the third data to the one or more data sinks.

Figure 6:
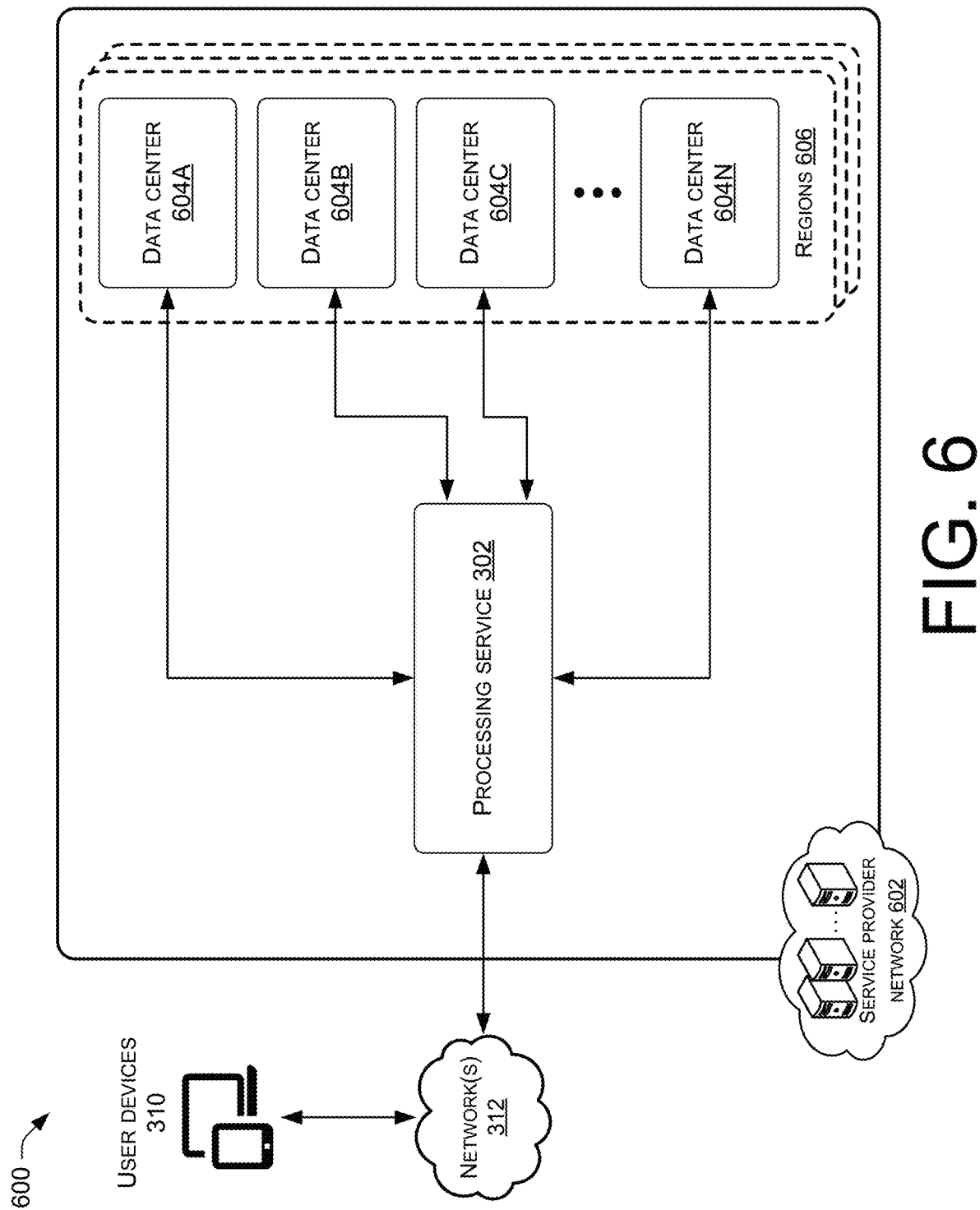
FIG. 6 illustrates an example system and network diagram that shows an operating environment including a service provider network that may be configured to implement aspects of the functionality described herein, according to an embodiment of the present disclosure.

FIG. 6 is system(s) and network diagram that shows an illustrative operating environment 600 that includes a service provider network 602. The service provider network 602 may be configured to implement aspects of the functionality described herein, such as the functions of the processing service 302 that allows users to generate and manage both certificate authorities and certificates. The service provider network 602 may provide computing resources, like virtual machine (VM) instances and storage, on a permanent or an as-needed basis. The computing resources provided by the network service provider 602 may include data processing resources, data storage resources, networking resources, data communication resources, network services, and the like. Among other types of functionality, the computing resources provided by the service provider network 602 may be utilized to implement the various services and components described above.

Each type of computing resource provided by the service provider network 602 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 602 may also be configured to provide other types of computing resources not mentioned specifically herein.

The computing resources provided by the service provider network 602 may be enabled in one embodiment by one or more data centers 604A-604N (which might be referred to herein singularly as "a data center 804" or in the plural as "the data centers 604"). The data centers 604 are facilities utilized to house and operate computer systems and associated components. The data centers 604 typically include redundant and backup power, communications, cooling, and security systems. The data centers 604 may also be located in geographically disparate locations, or regions 606. One illustrative embodiment for a data center 604 that may be utilized to implement the technologies disclosed herein will be described below with regard to FIG. 7.

The users that utilize the service provider network 602 for the processing service 302, may access the computing resources provided by the service provider network 602 over any wired and/or wireless network(s) 312, which may be a wide area communication network ("WAN"), such as the Internet, an intranet or an Internet service provider ("ISP") network or a combination of such networks. For example, and without limitation, the user devices 310 operated by the users may be utilized to access the service provider network 602, or computing resources thereof, by way of the network(s) 312. It should be appreciated that a local-area network ("LAN"), the Internet, or any other networking topology known in the art that connects the data centers 604 to remote clients and other users may be utilized. It should also be appreciated that combinations of such networks may also be utilized. The processing service 302 offered as a service by the service provider network 602 may manage the deployment of computing resources of the service provider network 602 when generating and managing certificate authorities.

Figure 7:
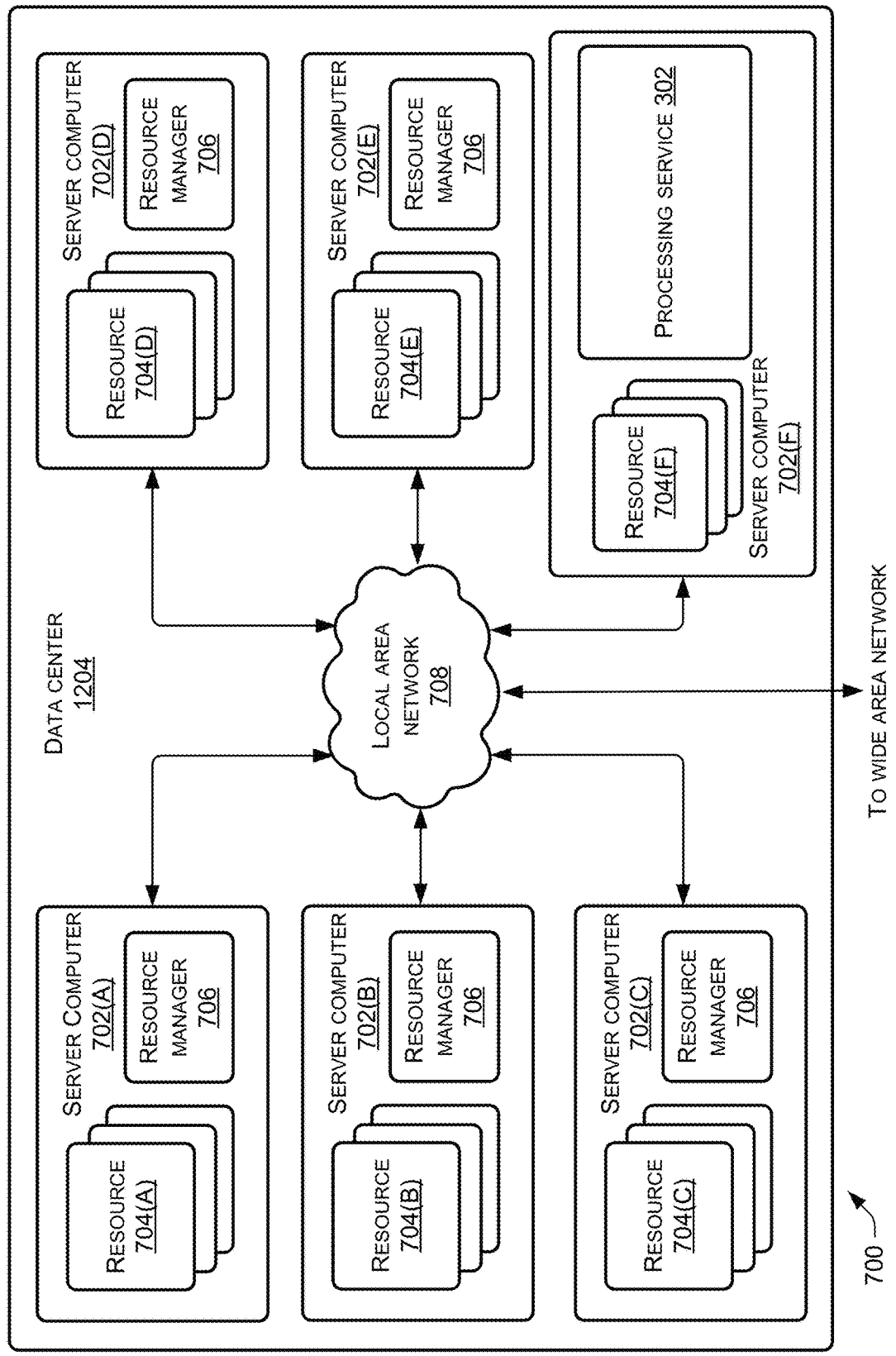
FIG. 7 illustrates an example computing system diagram showing a configuration for a data center that may be utilized to implement aspects of the technologies disclosed herein, according to an embodiment of the present disclosure.

FIG. 7 is a computing system diagram 700 that illustrates one configuration for the data center 1204 that implements aspects of the technologies disclosed herein. The example data center 1204 shown in FIG. 7 includes several server computers 702A-702F (which might be referred to herein singularly as "a server computer 702" or in the plural as "the server computers 702") for providing computing resources 704A-704E.

The server computers 702 may be standard tower, rack-mount, or blade server computers configured appropriately for providing the computing resources described herein (illustrated in FIG. 7 as the computing resources 704A-704E). The computing resources provided by the service provider network 702 may be data processing resources such as VM instances or hardware computing systems, database clusters, computing clusters, storage clusters, data storage resources, database resources, networking resources, and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 1204 may also be configured to provide network services and other types of services.

In the example data center 1204 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of the data centers 1204A-1204N, between each of the server computers 702A-702F in each data center 1204, and, potentially, between computing resources in each of the server computers 702. It should be appreciated that the configuration of the data center 1204 described with reference to FIG. 7 is merely illustrative and that other implementations may be utilized.

The data center 1204 shown in FIG. 7 also includes a server computer 702F that may execute some or all of the software components described above. For example, and without limitation, the server computer 702F (and the other server computers 702) may generally correspond to a server/computing device configured to execute components including, without limitation, the processing service 302 that generates and manages certificate authorities, as described herein, and/or the other software components described above. The server computer 702F may also be configured to execute other components and/or to store data for providing some or all of the functionality described herein. In this regard, it should be appreciated that the components illustrated in FIG. 7 as executing on the server computer 702F may execute on many other physical or virtual servers in the data centers 1204 in various embodiments. Thus, the data center 1204 in FIG. 7 may also include a plurality of server computers 702 that execute a fleet of VM instances.

Figure 8:
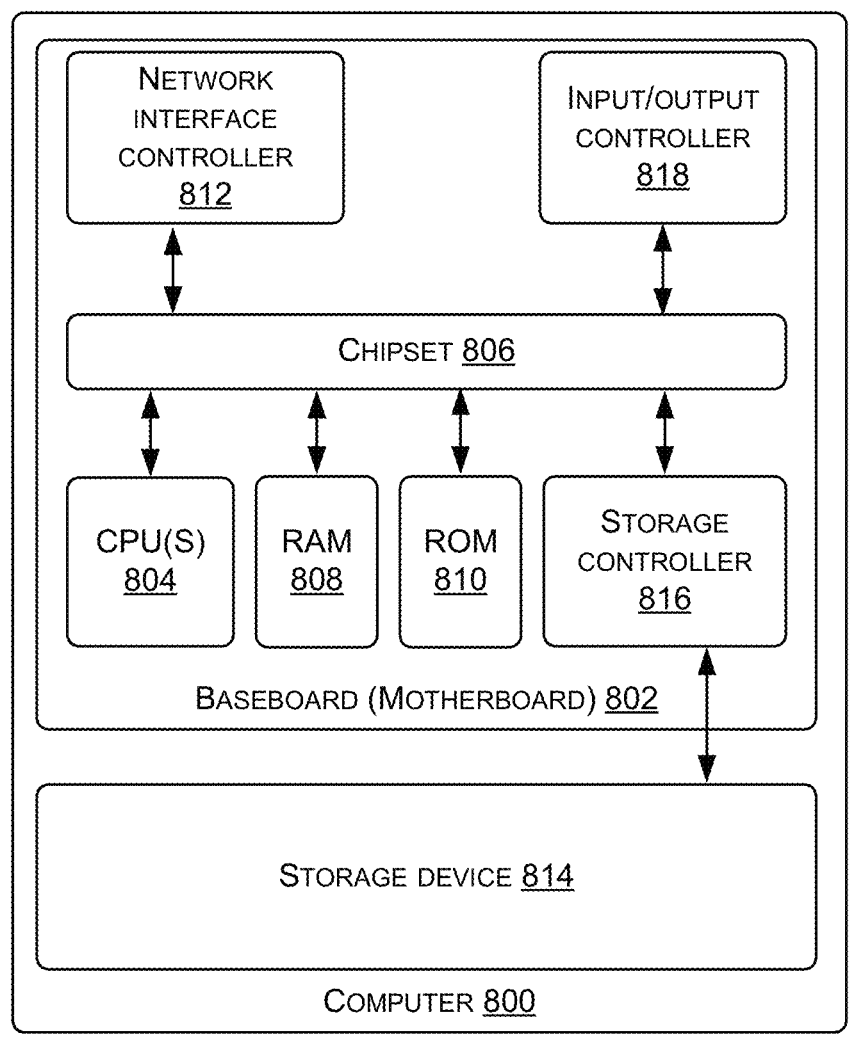
FIG. 8 illustrates an example computer architecture diagram showing an exemplary computer hardware architecture for implementing a computing device that may be utilized to implement aspects of the various technologies presented herein, according to an embodiment of the present disclosure.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and may be utilized to execute any of the software components presented herein. In some examples, the computer 800 may correspond to one or more computing devices that implements the components and/or services described herein (e.g., the user devices 310, the processing service 302, etc.).

The computer 800 includes a baseboard 802, or "motherboard," which is a printed circuit board to which a multitude of components or devices may be connected by way of system(s) bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random-access memory (RAM) 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAIVI may also store other software components necessary for the operation of the computer 800 in accordance with the configurations described herein.

The computer 800 may operate in a networked environment using logical connections to remote computing devices and computer systems through a network, such as the LAN 708. The chipset 806 may include functionality for providing network connectivity through a network interface controller (NIC) 812, such as a gigabit Ethernet adapter. The NIC 812 is capable of connecting the computer 800 to other computing devices over the LAN 708. It should be appreciated that multiple NICs 812 may be present in the computer 800, connecting the computer to other types of networks and remote computer systems.

The computer 800 may be connected to a mass storage device 814 that provides non-volatile storage for the computer 800. The mass storage device 814 may store an operating system, programs, and/or components including, without limitation, the processing service 302 that processes data using data pipelines, as described herein, and data, which have been described in greater detail herein. The mass storage device 814 may be connected to the computer 800 through a storage controller 816 connected to the chipset 806. The mass storage device 814 may consist of one or more physical storage units. The storage controller 816 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 814 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 814 is characterized as primary or secondary storage, and the like.

For example, the computer 800 may store information to the mass storage device 814 by issuing instructions through the storage controller 816 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 814 by detecting the physical states or characteristics of one or more particular locations within the physical storage units.

In addition to the mass storage device 814 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800. In some examples, the operations performed by the service provider network 1202, and or any components and/or services included therein, may be carried out by the processor(s).

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 814 may store an operating system utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The mass storage device 814 may store other system or application programs and data utilized by the computer 800.

In one embodiment, the mass storage device 814 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 4 and 5. The computer 800 may also include computer-readable storage media having instructions stored thereupon for performing any of the other computer-implemented operations described herein.

The computer 800 may also include one or more input/output controllers 818 for receiving and processing input from a number of input devices, such as a keyboard, a mouse, a touchpad, a touch screen, an electronic stylus, or other type of input device. Similarly, an input/output controller 818 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A system comprising:
one or more processors; and
one or more non-transitory computer-readable media storing instructions that, when executed by the one or more processors, cause the system to perform operations comprising:
receiving a first version of a message from one or more data sources;
processing, by a first component of a data pipeline, the first version of the message in order to generate:
a second version of the message; and
first metadata indicating at least a first change that occurred to the first version of the message during processing of the first version of the message by the first component;
generating, by the first component and based at least in part on maintaining a tracking of the first version of the message through the data pipeline, a first data object that includes a copy of the first version of the message, the second version of the message, and the first metadata,
wherein the generating of the first data object to maintain the tracking of the first version of the message through the data pipeline is based at least in part on the first component not outputting the copy of the first version of the message to one or more data sinks, not outputting the second version of the message to the one or more data sinks, and not outputting the first metadata to the one or more data sinks;
sending, by the first component and based at least in part on generating the first data object, the first data object to a second component of the data pipeline;

processing, by the second component of the data pipeline, the second version of the message from the first data object in order to generate:
  a third version of the message; and
  second metadata indicating at least a second change that occurred to the second version of the message during processing of the second version of the message by the second component;
generating, by the second component, a second data object that includes the copy of the first version of the message, a copy of the second version of the message, the first metadata, the third version of the message, and the second metadata;
outputting the second data object to the one or more data sinks; and
based at least in part on outputting the second data object to the one or more data sinks, removing the first data object from a temporary memory.

2. The system as recited in claim 1, wherein:
sending the first data object to the second component of the data pipeline comprises at least:
  writing, by the first component, the first data object into the temporary memory; and
  reading, by the second component, the first data object from of the temporary memory.

3. A method comprising:
receiving first data of a message from one or more data sources;
processing, using a first component of a data pipeline, the first data in order to generate second data of the message;
generating metadata representing information describing processing the first data using the first component of the data pipeline;
generating, by the first component and based at least in part on maintaining a tracking of the message through the data pipeline, a data object that includes at least a copy of the first data, the second data, and the metadata, wherein the generating of the data object to maintain the tracking of the message through the data pipeline is based at least in part on the first component not outputting the copy of the first data to one or more data sinks and not outputting the second data to the one or more data sinks;
sending, by the first component and based at least in part on generating the data object, the data object to a second component of the data pipeline;
processing, using the second component of the data pipeline, the second data from the data object in order to generate third data;
based at least in part on processing the second data in order to generate the third data, outputting the copy of the first data, a copy of the second data, the third data, and the metadata to the one or more data sinks; and
based at least in part on the processing the second data, removing the data object from the temporary memory.

4. The method as recited in claim 3, further comprising:
generating additional metadata representing additional information describing processing the second data using the second component of the data pipeline; and
outputting the second metadata to the one or more data sinks.

5. The method as recited in claim 3, wherein generating the metadata representing the information describing processing the first data using the first component comprises generating the metadata that includes at least one of:

first metadata representing a version of the second data;
second metadata representing a status of the second data;
third metadata representing a type of the second data;
fourth metadata representing a change that occurred when processing the first data in order to generate the second data;
fifth metadata representing a reason for the status;
a version associated with the first component;
a version associated with the data pipeline;
whether an error occurred during processing of the first data; or
a time associated with processing the first data.

6. The method as recited in claim 3, further comprising:
storing the data object in the temporary memory, wherein sending the data object to the second component of the data pipeline comprises sending the data object from the temporary memory to the second component of the data pipeline.

7. The method as recited in claim 3, further comprising:
generating an additional data object that includes at least the copy of the first data, the copy of the second data, and the third data,
and wherein outputting the copy of the first data, the copy of the second data, the third data, and the metadata to the one or more data sinks comprises at least outputting the additional data object to the one or more data sinks.

8. The method as recited in claim 3, wherein processing the first data in order to generate the second data comprises:
processing, using a first process of the first component, the first data in order to generate fourth data of the message; and
processing, using a second process of the first component, the fourth data in order to generate the second data,
and wherein the data object further includes a copy of the fourth data.

9. The method as recited in claim 8, further comprising:
generating first metadata representing first information describing processing the first data using the first process of the first component; and
generating second metadata representing second information describing processing the fourth data using the second process of the first component,
and wherein the data object further includes the first metadata and the second metadata.

10. The method as recited in claim 3, wherein processing the first data in order to generate the second data comprises:
processing, using a first process of the first component, the first data in order to generate fourth data of the message; and
processing, using a second process of the first component, the fourth data in order to generate the second data,
and wherein the data object does not include a copy of the fourth data.

11. The method as recited in claim 3, further comprising:
receiving, from an electronic device, a request for the second data;
based at least in part on receiving the request, retrieving the copy of the second data from the one or more data sinks; and
sending the copy of the second data to the electronic device.

12. The method as recited in claim 3, further comprising:
sending the data object to a third component of the data pipeline;
processing, using the third component of the data pipeline, the second data from the data object in order to generate fourth data; and storing the copy of the first data, a copy of the second data, and the fourth data in one or more databases.

13. The method as recited in claim 3, further comprising:
processing, using a third component of the data pipeline, the second data from the data object; and
generating metadata representing information describing processing the second data using the third component,
and wherein the data object further includes the metadata.

14. A system comprising:
one or more processors; and
one or more non-transitory computer-readable media storing instructions that, when executed by one or more processors, cause the system to perform operations comprising:
  receiving first data of a message from one or more data sources;
  processing, using a first component of a data pipeline, the first data in order to generate second data of the message;
  generating metadata representing information describing processing the first data using the first component of the data pipeline;
  generating, by the first component and based at least in part on maintaining a tracking of the message through the data pipeline, a data object that includes at least a copy of the first data, the second data, and the metadata,
  wherein the generating of the data object to maintain the tracking of the message through the data pipeline is based at least in part on the first component not outputting the copy of the first data to one or more data sinks and not outputting the second data to the one or more data sinks;
  sending, by the first component and based at least in part on generating the data object, the data object to a second component of the data pipeline;
  processing, using the second component of the data pipeline, the second data from the data object in order to generate third data;
  based at least in part on processing the second data in order to generate the third data, outputting the copy of the first data, a copy of the second data, the third data, and the metadata to the one or more data sinks; and
  based at least in part on the processing the second data, removing the data object from a temporary memory.

15. The system as recited in claim 14, wherein sending, by the first component, the data object to the second component of the data pipeline comprises sending a reference associated with the data object from the first component of the data pipeline to the second component of the data pipeline.

16. The system as recited in claim 14, the operations further comprising:
storing the data object in the temporary memory,
and wherein sending the data object to the second component of the data pipeline comprises sending the data object from the temporary memory to the second component of the data pipeline.

17. The system as recited in claim 14, wherein generating the metadata representing the information describing processing the first data using the first component of the data pipeline comprises generating the metadata that includes at least one of:
first metadata representing a version of the second data;
second metadata representing a status of the second data;
third metadata representing a type of the second data;
fourth metadata representing a change that occurred when processing the first data in order to generate the second data;
fifth metadata representing a reason for the status;
a version associated with the first component;
a version associated with the data pipeline;
whether an error occurred during processing of the first data; or
a time associated with processing the first data.

18. The system as recited in claim 14, wherein:
sending the data object to the second component of the data pipeline comprises at least:
writing, by the first component, the data object into the temporary memory; and
reading, by the second component, the data object from of the temporary memory.

19. The system as recited in claim 14, the operations further comprising:
generating additional metadata representing additional information describing processing the second data using the second component of the data pipeline; and
outputting the second metadata to the one or more data sinks.

20. The system as recited in claim 14, the operations further comprising:
generating an additional data object that includes at least the copy of the first data, the copy of the second data, and the third data,
and wherein outputting the copy of the first data, the copy of the second data, the third data, and the metadata to the one or more data sinks comprises at least outputting the additional data object to the one or more data sinks.

* * * * *